United States Patent [19]

Kamman

[11] 4,270,382
[45] Jun. 2, 1981

[54] GAP MEASUREMENT APPARATUS

[75] Inventor: Daniel T. Kamman, Westport, Mass.

[73] Assignee: Polaroid Corporation, Cambridge, Mass.

[21] Appl. No.: 108,347

[22] Filed: Dec. 31, 1979

[51] Int. Cl.³ ............................................. G01B 13/12
[52] U.S. Cl. ................................................... 73/37.5
[58] Field of Search ............................... 73/37.5, 37.6

[56] References Cited

U.S. PATENT DOCUMENTS

| 3,494,176 | 2/1970 | Sharp et al. ............................ 73/37.5 |
| 3,727,550 | 4/1973 | Easoz et al. |
| 3,754,433 | 8/1973 | Hyer ....................................... 73/37.6 |
| 3,941,485 | 3/1976 | Madden |

Primary Examiner—S. Clement Swisher
Assistant Examiner—Joseph W. Roskos
Attorney, Agent, or Firm—John J. Kelleher

[57] ABSTRACT

Apparatus for measuring the distance between a coating applicator and a backing roller that supports a moving web onto which coating material is deposited by said applicator, apparatus that improves distance measuring accuracy and avoids potential damage-causing physical contact with said backing roller.

7 Claims, 7 Drawing Figures

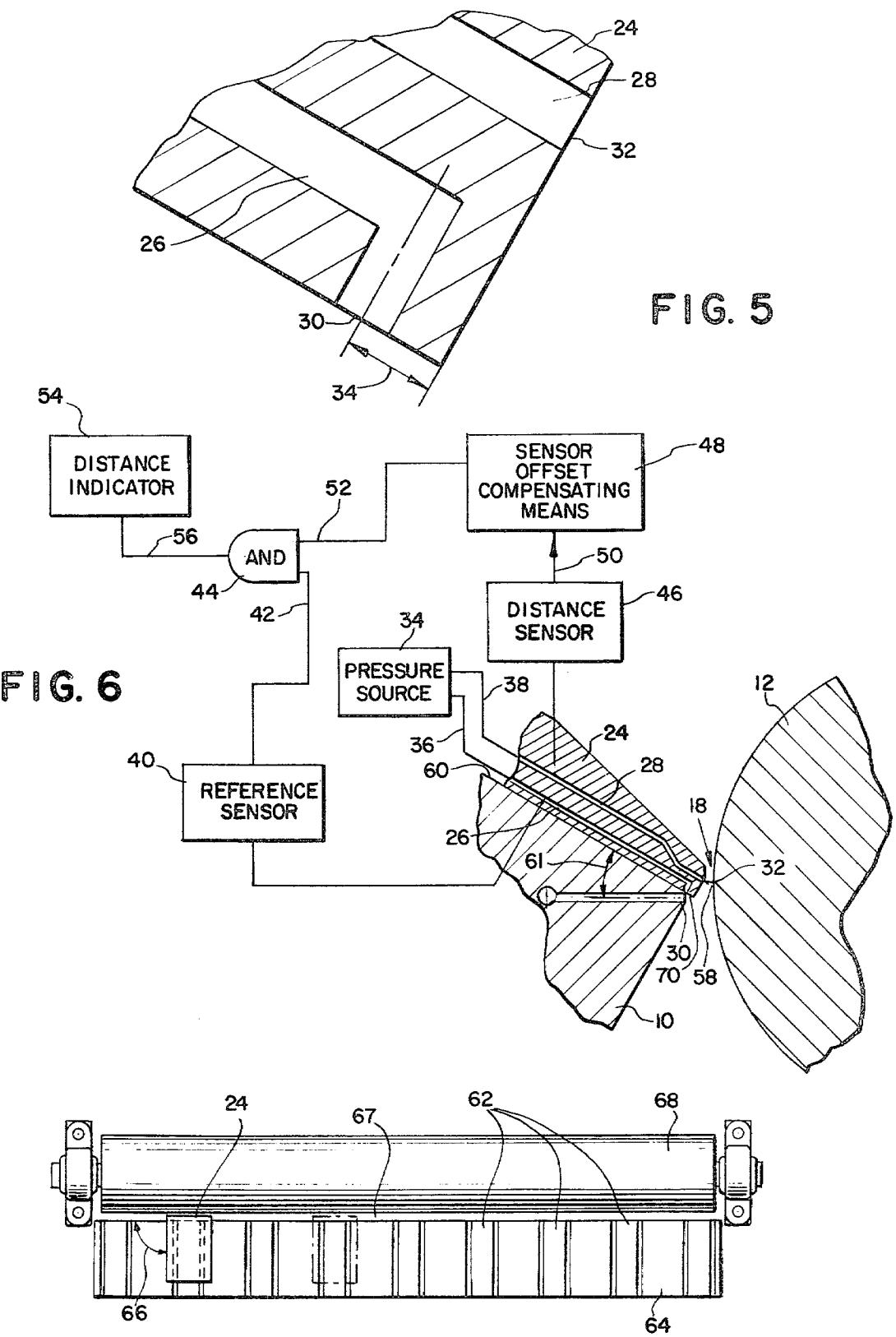

GAP MEASUREMENT APPARATUS

BACKGROUND OF THE INVENTION

1. Field of the Invention

The present invention relates to apparatus for measuring distance between points on an object or objects that are spaced from one another, in general, and to such apparatus for measuring the distance between a coating applicator and a backing roller physically spaced from said applicator, in particular.

2. Description of the Prior Art

In the operation of present-day coating apparatus where coatings of critical thickness are desired to be deposited on a substrate such as a moving web for use in photographic film, it is necessary to precisely control the gap or distance between the coating applicator and the substrate onto which said coating is deposited by said applicator in order to control coating thickness. This gap dimension is normally controlled by controlling the distance between the coating applicator and said web or between the coating applicator and a coating or backing roller, a device that supports the web and transports same to said applicator for coating.

Coating applicators are frequently removed from coating apparatus for any number of reasons, the most common one being for applicator cleaning. If the applicator is removed from the coating apparatus for an excessive period of time, web coating production will be adversely affected. In order to minimize the down time or the time that the coating apparatus is not applying a coating to a moving web and the attendant lost production, it is essential that that applicator be returned to its precise web-coating position as soon as possible.

The present method for establishing the desired spacing between a coating applicator and a backing roller for a moving web involves placing one or more shims or feeler gauges of the appropriate thickness at several spaced-apart positions between the applicator and the backing roller while the applicator is in a movable condition and the backing roller mountings are mounted in a fixed position. Once the desired spacing has been established, the applicator is clamped in a fixed position.

One applicator-to-backing roller measurement technique involves plastic shim stock or feeler gauges and a touch sensitive to looseness and tightness of fit. More accurate steel feeler gauges cannot be used because they damage applicators and rollers.

The use of plastic feeler gauges to establish the proper applicator-to-backing roller gap has several disadvantages. Feeler gauges are available in limited sizes and it is often necessary to make sandwiches of several feeler gauges. Feeler gauges buckle readily, especially those that are extremely thin. The thinnest useable feeler guage is 1.0 mil and therefore the effective resolution with such a gauge is approximately 0.5 mil. Also, different people get different results because of their different sensitivity to looseness and tightness of fit.

While the use of feeler gauges will result in the spacing of an applicator from its associated moving web backing roller to within acceptable tolerances, in addition to the disadvantages noted above, this method consumes a disproportionate share of coating apparatus down time when, for example, the applicator is removed for cleaning.

An object of the present invention is to provide apparatus for rapidly and more accurately establishing the proper spacing between objects that are spaced apart from one another.

SUMMARY OF THE INVENTION

In accordance with the teachings of the present invention, apparatus for measuring the distance between spaced objects is provided. The apparatus includes at least a pair of sensors mounted on a support member that are separated a precise distance from one another. One sensor produces a signal representative of a selected reference position on one of said objects and the other sensor produces a signal representative of the distance from said other sensor to another ojbect. Means dependent upon the magnitude of the distance between said pair of sensors are provided that produces a signal representative of the distance between said objects when said support member is oriented in a specific direction with respect to one of said objects and when said reference position sensing means is producing a signal representative of said reference position.

BRIEF DESCRIPTION OF THE DRAWINS

FIG. 5 is an enlarged detail of the gap sensing apparatus depicted in FIG. 4.

FIG. 6 is a functional block diagram and schematic of the distance measuring apparatus of the present invention.

FIG. 7 is a top view of an applicator and backing roller showing lateral alignment apparatus for the distance sensing apparatus of the present invention.

DESCRIPTION OF THE PREFERRED EMBODIMENTS

Figure 1:
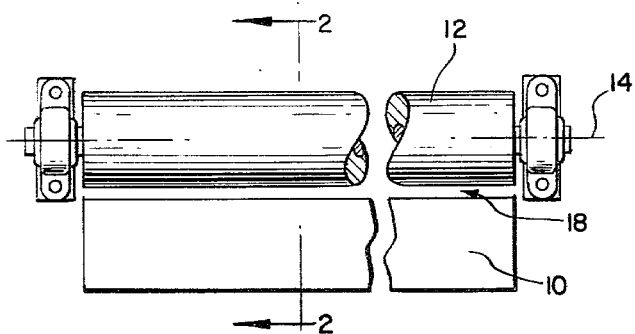
FIG. 1 is a top view of a backing roller and a coating applicator spaced from said roller.
Figure 2:
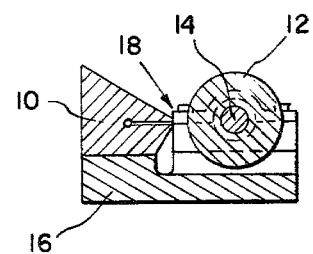
FIG. 2 is a sectional view taken along the line 2—2 in FIG. 1.
Figure 3:
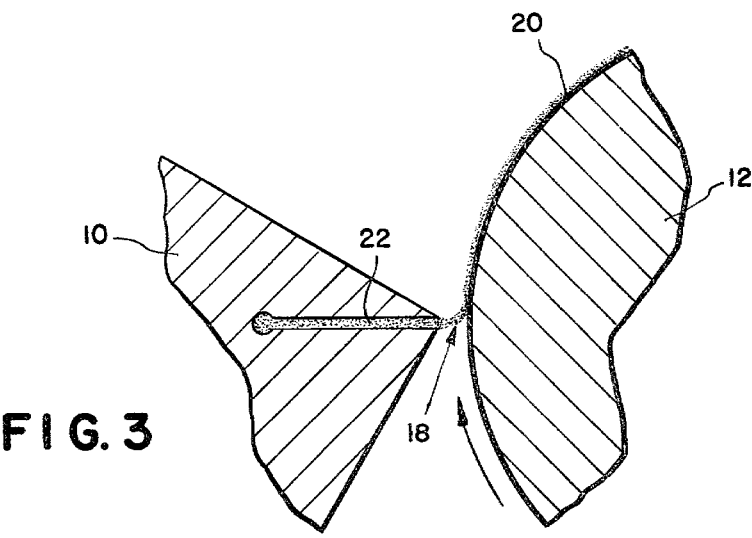
FIG. 3 is an enlarged detail of the applicator/backing roller interface depicted in FIG. 2 showing said applicator depositing coating material on a web carried by said backing roller.
Figure 4:
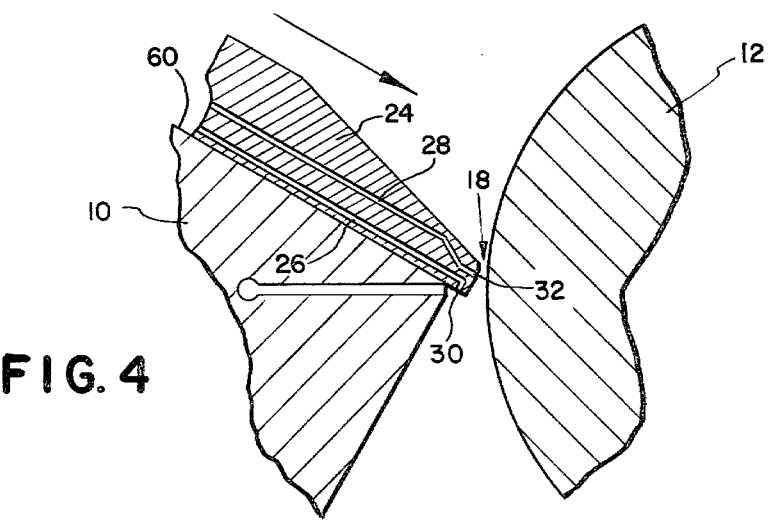
FIG. 4 is an enlarged detail of the applicator/backing roller interface depicted in FIG. 2 showing a portion of the applicator/backing roller gap sensing apparatus of the present invention.

Referring now to the drawings, and specifically to FIGS. 1, 2 and 3, reference numerals 10 and 12 designate a coating applicator and its associated backing roller, respectively. Backing roller 12 is mounted for rotation about axis 14 and extrusion type applicator 10 is demountably attached to support member 16 by conventional clamping means (not shown) such that gap 18 is created between said applicator 10 and said backing roller 12. Gap 18 is of uniform width in that it has the same magnitude or spacing from one end of said gap to the other.

Backing roller 12 rotates in a clockwise direction as viewed in FIGS. 2 and 3. Backing roller 12 supports substrate or web 20 and rotatably transports same as said roller is rotated about rotational axis 14. Coating material 22 is supplied to coating applicator 10 from a coating material reservoir (not shown) and said material 22 is deposited on web 20 with a uniform thickness, across gap 18. In addition to the flow rate of material 22 and the speed of rotation of backing roller 12, the uniformity of the coating material deposited on web 20 by applicator 10 is dependent upon the uniformity of gap 18 between said applicator 10 and said backing roller 12.

As explained above, the present method of establishing the desired spacing or gap between a backing roller and an adjacent coating applicator involves the use of a feeler gauge with the disadvantages noted above. These disadvantages are avoided with the present invention, an embodiment of which is shown in FIGS. 4–7.

Turning now to the gap measurement apparatus of the present invention and to FIGS. 4–7 illustrating a preferred embodiment thereof, reference numeral 24 designates the measurement probe of said gap measurement apparatus. Probe 24 forms a pair of pneumatic sensor tubes 26 and 28 having openings 30 and 32, respectively, said openings being spaced a precise distance 34 from one another. Measurement probe 24 is also referred to herein as the support member for said sensor tubes 26 and 28. Sensor tube 26 and its opening 30 generate pressure variations representative of a reference position on one object at said opening 30, and sensor tube 28 and its opening 32 generate pressure variations representative of the distance to another object spaced from said opening 32.

Pressure source 34 supplies pneumatic or air pressure to sensor tubes 26 and 28 through paths 36 and 38, respectively. Pressure variations in sensor tube 26 are sensed by reference sensor 40, said sensor 40 generating a discrete signal at its output when the pressure in said tube 26 varies by a predetermined magnitude. The signal generated by sensor 40 is routed through path 42, a signal that supplies one of the necessary two inputs to AND gate 44. Distance sensor 46 generates an analog signal that is proportional to variations in air pressure in tube 28. The signal generated by distance sensor 46 is routed to sensor offset compensating means 48 through path 50. Sensor offset compensating means 48 modifies the distance signal of distance sensor 46, a modification that, in effect, adds the distance 34 (FIG. 5) to the sensed distance from opening 32 to an object spaced from said opening 32 to produce an analog signal at its output representative of the distance from opening 30 of sensor tube 26 to said spaced object.

The modified distance signal appearing at the output of compensating means 48 is routed to AND gate 44 through path 52. When inputs to AND gate 44 are present in paths 42 and 52, the analog signal that is present in said path 52 passes through AND gate 44 and is routed through distance indicator or meter 54 through path 56 where said meter 54 visually indicates the actual distance from opening 30 in sensor tube 26 to an object spaced from opening 32 and sensed by said sensor tube 28.

The object distance measured by the gap measurement apparatus of the present invention is measured along the line 58 in FIG. 6 and/or lines parallel thereto, lines that have a specific orientation with respect to coating applicator 10. Means are provided that orient measurement probe 24 of the distance measuring apparatus of the present invention in the direction of such lines for proper gap 18 measurement. In FIG. 6, the proper vertical position for measurement probe 24 is obtained by providing planar surface 60 on coating applicator 10 that will orient measurement probe 24 at the proper vertical angle 61 with respect to applicator 10 when a surface of measurement probe 24 is placed in contact with said surface 60. The proper lateral angle of measurement probe 24 may be obtained in a number of ways. In FIG. 7, for example, measurement probe 24 is inserted in grooves 62 formed in a surface of applicator 64, grooves that provide the proper lateral angle 66 for said probe 24 with respect to said applicator 64 so that the desired gap dimension of gap 67 between applicator 64 and backing roller 68 can be measured.

DISCUSSION

Pneumatic distance measuring devices are presently available that can measure distances to within 0.1 mil which is substantially greater than the 0.5 mil resolution that is available with plastic feeler gauges. Opening 30 in sensor tube 26 can be made small enough to sense a reference point such as a point on the edge 70 of extrusion type applicator 10 to within the 0.1 mil resolution obtainable with said presently available pneumatic distance measuring devices.

To measure the gap or the distance between applicator 10 and backing roller 12, measurement probe 24 is manually placed in a lateral position maintaining groove (not shown) in surface 60 of applicator 10 such as a groove 62 in FIG. 7, such that opening 30 of sensor tube 26 is covered or closed by said surface 60. When this occurs, the pressure in sensor tube 26 supplied by pressure source 34 reaches a maximum value and then stabilizes at said maximum value. Measuring probe 24 is then manually moved toward backing roller 12 until said opening 30 of sensor tube 26 reaches edge 70 (FIG. 6) of applicator 10. When opening 30 reaches said edge 70, said opening 30 is no longer covered by applicator surface 60 which causes the pressure in sensor tube 26 to drop because of the air leakage through said opening 30. This sudden drop in tube 26 pressure is sensed by reference sensor 40 causing said reference sensor 40 to generate a reference position signal at its output corresponding to a point on edge 70 of applicator 10, a signal that is routed to AND gate 44 through paths 42. With measurement probe 44 maintained in the position where opening 30 in sensor tube 26 is at a reference point on edge 70, a pressure develops in said sensor tube 28 as a result of pressure being supplied by pressure source 34 and the proximity of backing roller 12, said backing roller 12 creating a back pressure in said tube 28 as it partially restricts the flow of air from opening 32. Distance sensor 46 senses the pressure in sensor tube 28 and generates a signal at its output corresponding to the distance between opening 32 in sensor tube 28 and backing roller 12 along axis 58, an axis that is parallel to surface 60. The distance signal at the output of distance sensor 46 is modified by compensating means 48, as explained above, and is then routed to AND gate 44 through path 52. The distance signal on path 52 passes through AND gate 44 because of the presence of a reference signal on input path 42, and said distance signal is routed to distance indicator 54 through path 56 where the magnitude of gap 18 is visually displayed. Even through the distance signal on path 56 is representative of the distance between a reference point on edge 70 and backing roller 12 along axis 58, distance indicator 54 is calibrated to indicate the shortest distance between applicator 10 and backing roller 12 by taking into account the vertical angle 61 of applicator surface 60 and the radius of backing roller 12 together with the location of the axis of rotation of said backing roller 12. Additional measurements are taken at other lateral position maintaining grooves (not shown) in applicator 10 surface 60.

The preferred embodiment of the present invention describes an arrangement where an indicator is utilized to visually display gap distance, only when a reference signal and a distance signal are present at the input to AND gate 44. A less sophisiticated method of obtaining the proper gap measurement is to have both a reference position indicator and a distance indicator. In such an arrangement, the distance indicator would indicate at all times. However, the gap distance indicator would be read only when the reference indicator was indicating that a known reference position had been selected.

In the preferred embodiment, grooves such as groove 62 in FIG. 7 are utilized for lateral alignment of the measurement probe of the gap measurement apparatus of the present invention. Other lateral alignment devices could be utilized, however. For example, a plurality of laterally spaced pneumatic sensors incorporated in the measurement probe could be used to establish the positional relationship between said measurement probe and the applicator edge. The measurement probe would sense two spaced-apart reference positions on the applicator edge which would provide the means for aligning the measurement probe at the proper lateral angle for gap measurement purposes.

It will be apparent to those skilled in the art from the foregoing description of my invention that various improvements and modifications can be made in it without departing from its true scope. The embodiments described herein are merely illustrative and should not be viewed as the only embodiments that encompass my invention.

What is claimed is:

1. Apparatus for measuring the distance between spaced objects, comprising:
   a support member;
   a reference position sensing means mounted on said support member for producing a signal representative of a selected reference position on a first object;
   an object distance sensing means mounted on said support member at a precise known distance from said reference position sensing means for producing a signal representative of the distance to a second object spaced from said object distance sensing means;
   means for aligning said support member in a known direction with respect to one of said objects; and
   means responsive to said object distance sensing means signal for producing a signal representative of the distance between said selected reference position and said second object when said reference position sensing means is producing a signal representative of said selected reference position.

2. Apparatus according to claim 1, wherein said spaced objects are a coating applicator and a backing roller for transporting a web to said coating applicator.

3. Apparatus according to claim 1 wherein said support member aligning means is a plurality of grooves formed in one of said objects for cooperatively engaging a portion of said support member such that when said support member and one of said grooves are cooperatively engaged, said support member is aligned in said known direction with respect to said one of said objects.

4. Apparatus according to claim 1, wherein said reference position sensing means and said object distance sensing means includes a pneumatic sensor.

5. Apparatus according to claim 1, further comprising a visual indicator responsive to said object distance signal when said reference position sensing means is producing a signal representative of a selected reference position.

6. Apparatus according to claim 1, further comprising first and second visual indicators, said first indicator being responsive to said object distance signal and said second visual indicator being responsive to said reference position signal.

7. Apparatus according to claim 1, wherein said support means forms a pair of pressurizable tubes with each of said tubes having an open end for the passage of a pressurized gas therefrom.

* * * * *